July 1, 1930.  C. R. RANEY ET AL  1,769,163
ENSILAGE CUTTER
Filed April 30, 1928   6 Sheets-Sheet 6
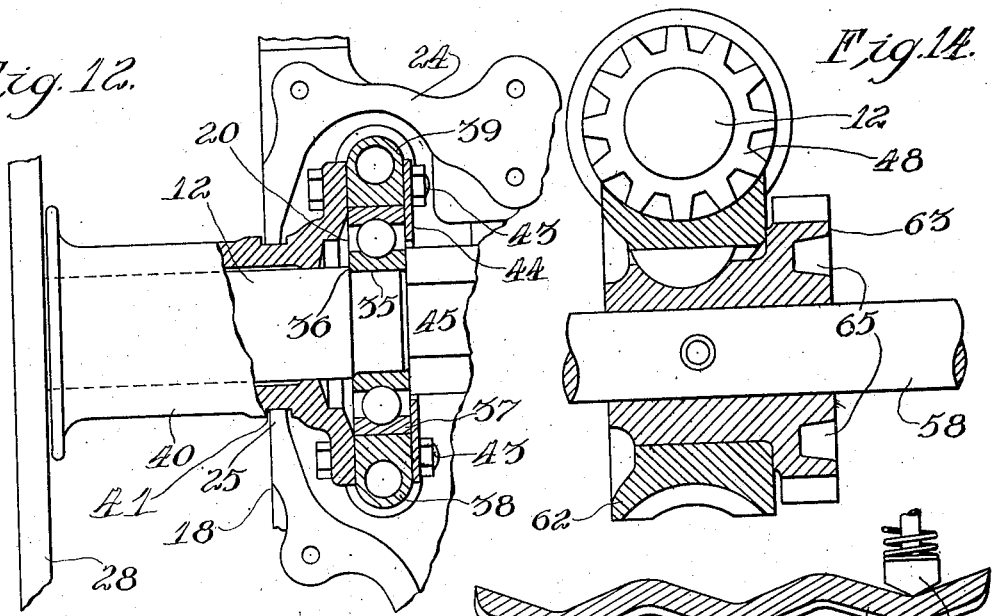

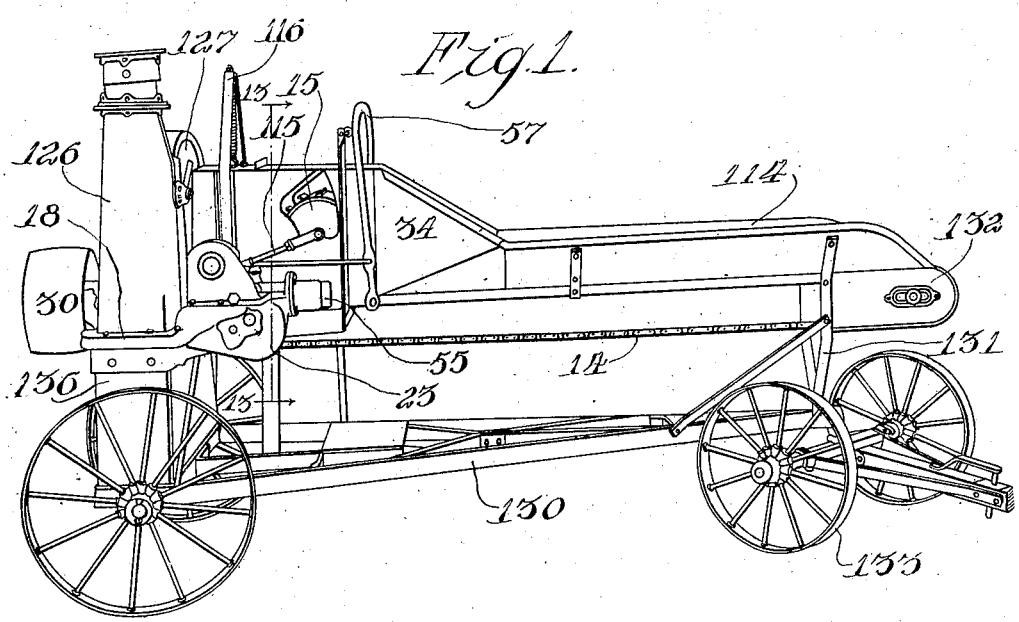
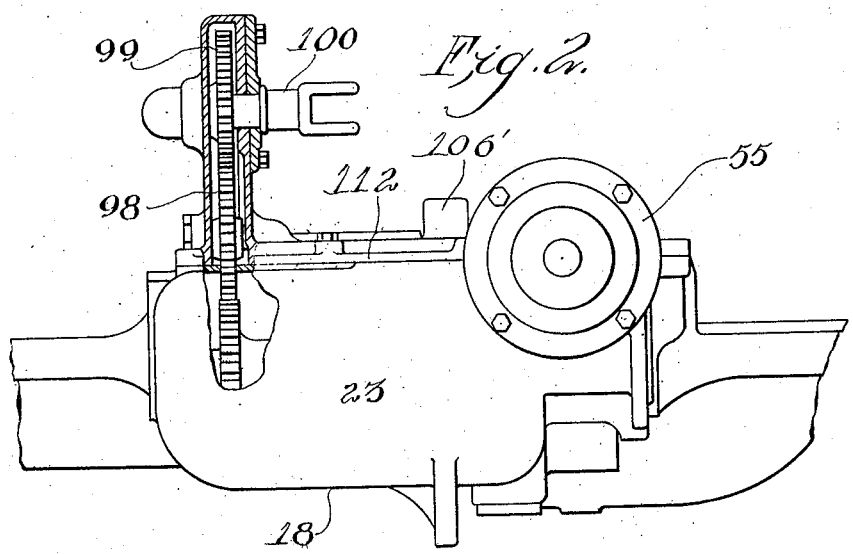
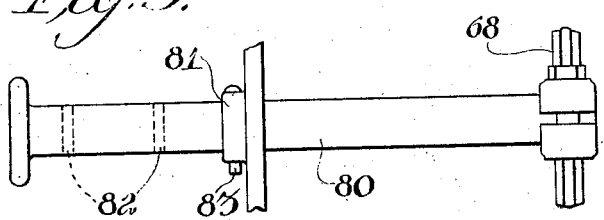

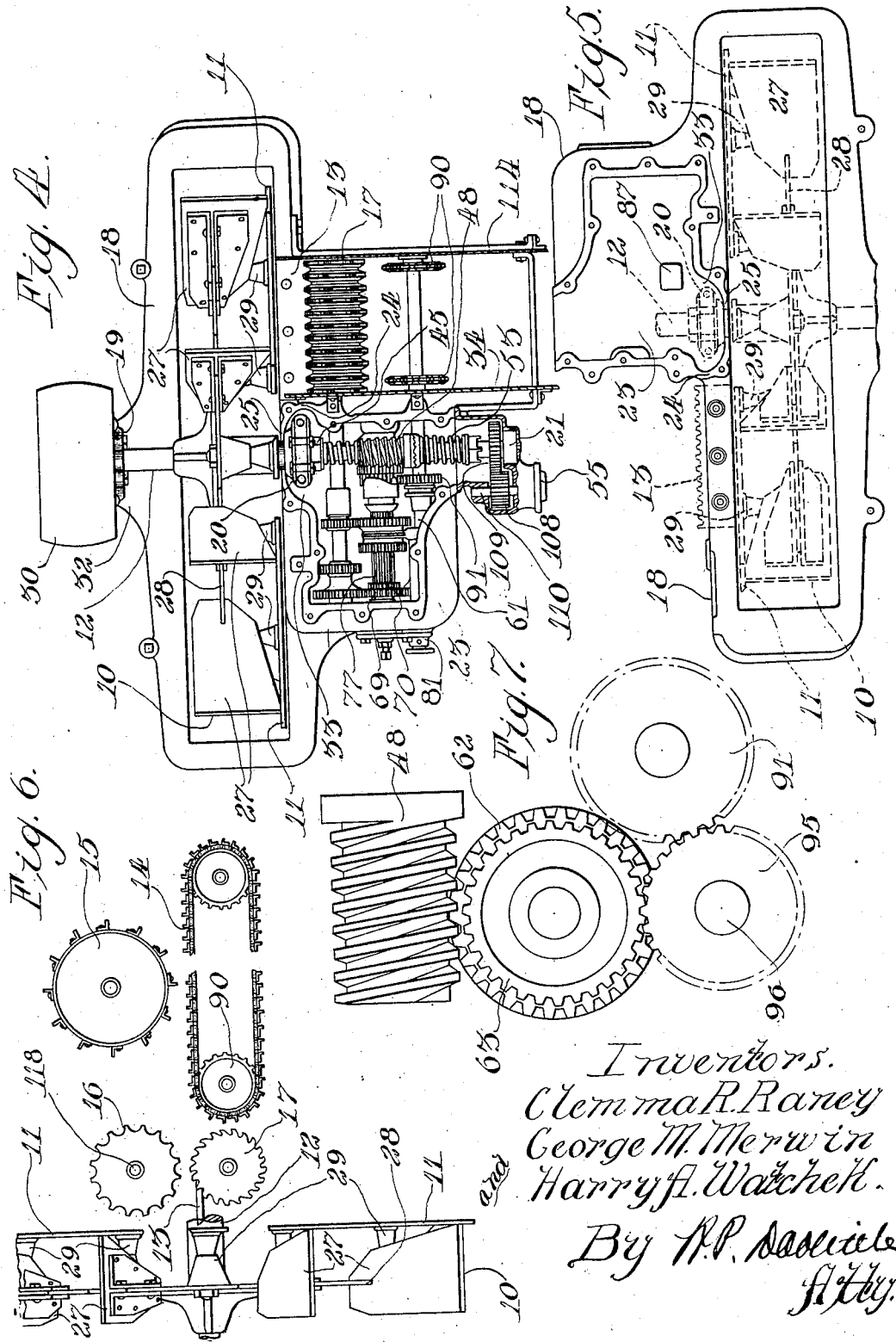

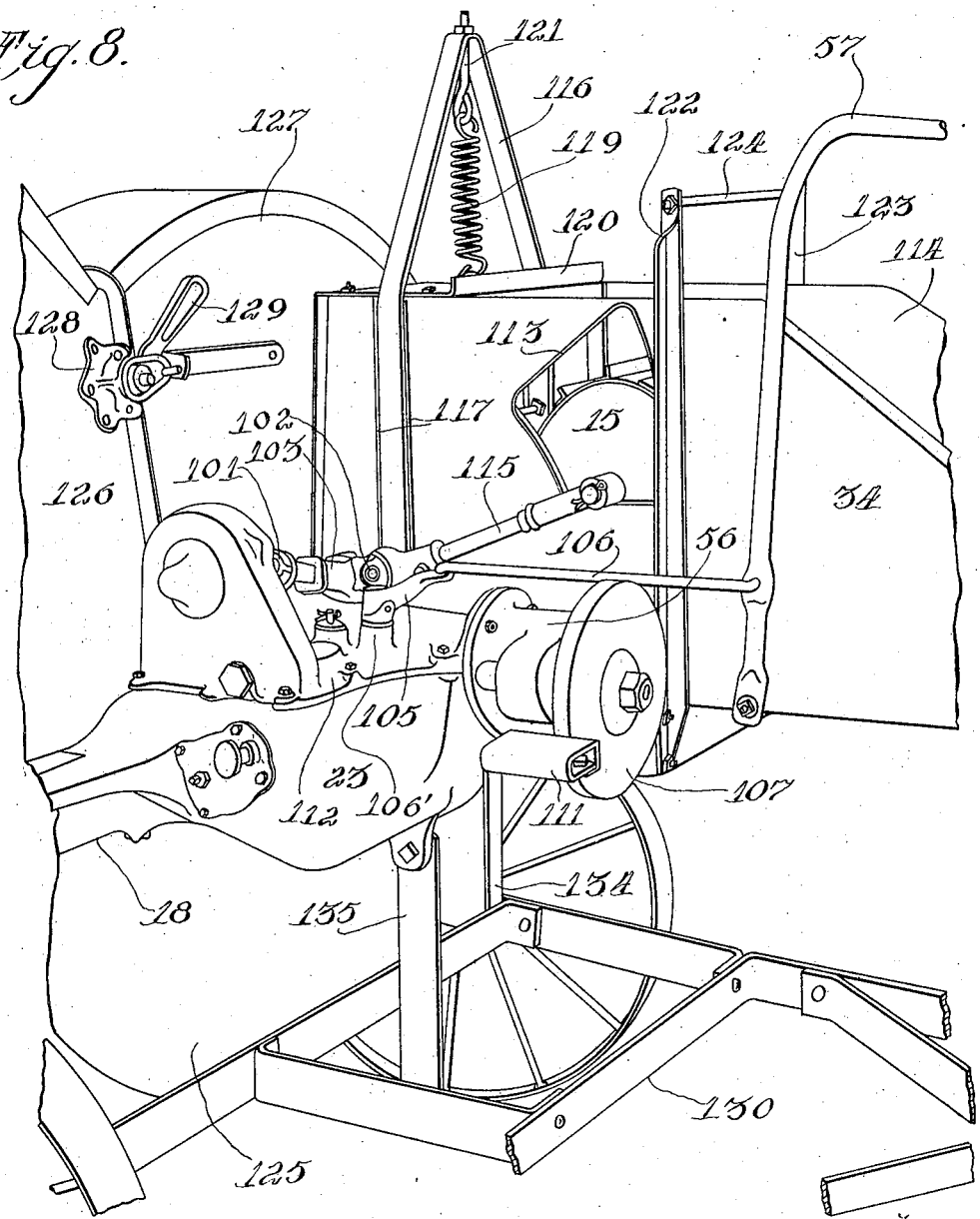

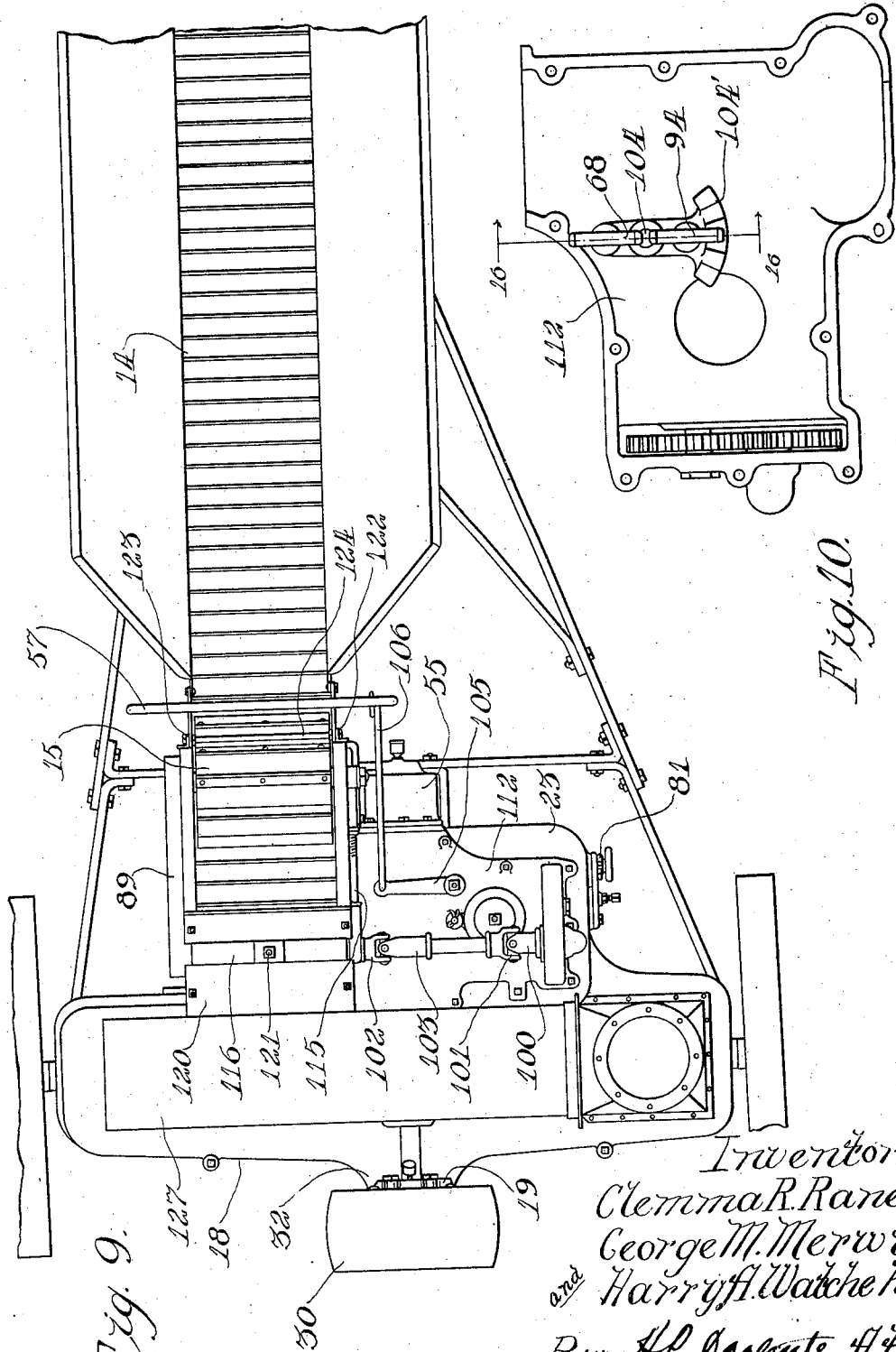

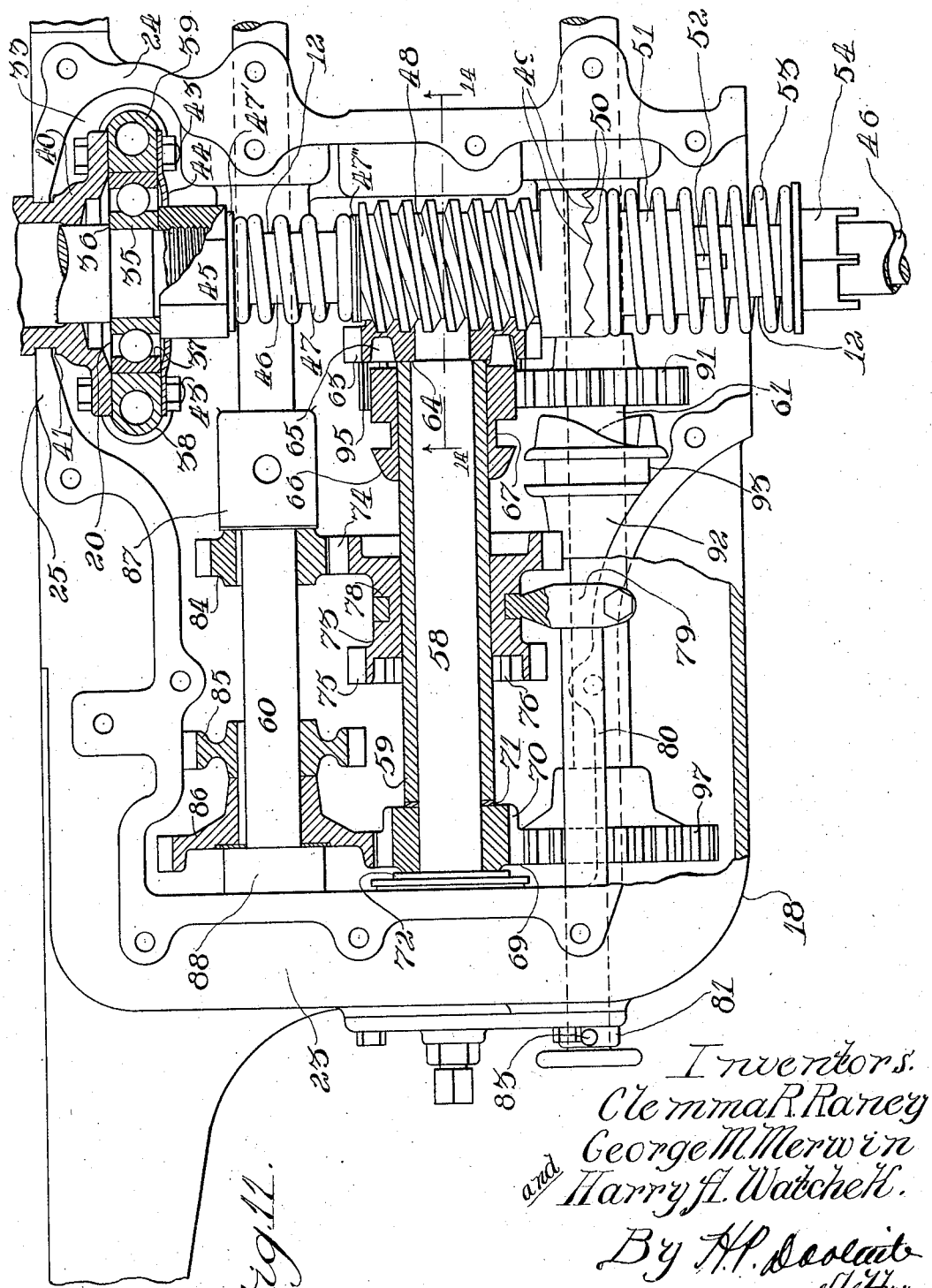

Patented July 1, 1930

1,769,163

UNITED STATES PATENT OFFICE

CLEMMA R. RANEY, OF RIVERSIDE, AND GEORGE M. MERWIN AND HARRY A. WATCHEK, OF CHICAGO, ILLINOIS, ASSIGNORS TO INTERNATIONAL HARVESTER COMPANY, A CORPORATION OF NEW JERSEY

ENSILAGE CUTTER

Application filed April 30, 1928. Serial No. 273,824.

This invention presents improvements in ensilage cutters.

It is an object of the invention to provide a compact and durable ensilage cutter of novel construction.

Another object of the invention is to provide an ensilage cutter having novel transmission mechanism for driving the conveyer and the feeding mechanism from the shaft which carries the combined cutter and blower.

A further object of the invention is to provide an ensilage cutter having a unitary casting which houses the gearing of the transmission mechanism and which affords a support for the shaft carrying the combined blower and cutter, this combined structure operating through an opening in the casting.

Further objects of the invention will appear as the following description proceeds.

An illustrative embodiment of the invention is shown in the accompanying drawings in which:

Figure 1 is a perspective view showing the entire ensilage cutter, and particularly the relationship of the blower support and the transmission casing;

Figure 2 is a side elevation of a combined blower support and transmission casing, having parts of the walls of the gear casing broken away to show the arrangement of the enclosed gearing;

Figure 3 is a detail view of the gear shifting rod which extends through a wall of the transmission casing;

Figure 4 is a plan of the machine with certain covers removed so as to show the blower, the transmission, and parts of the stalk feeding mechanism;

Figure 5 is a plan of the unitary blower support and gear casing, showing in dotted lines the relationship of the blower, the stationary cutter bar, and the thrust bearing for the blower shaft;

Figure 6 is a schematic view somewhat in the nature of a vertical section, showing the general relationship of the parts of the illustrative machine;

Figure 7 is a detail view showing the arrangement of certain of the gears and shafts within the transmission casing;

Figure 8 is a close-up perspective view of the transmission side of the blower casing;

Figure 9 is a plan;

Figure 10 is a plan of the cover of the transmission, the view being taken looking down upon the cover when it is removed from the transmission casing and turned bottom side up;

Figure 11 is an enlarged horizontal sectional view showing the transmission casing and the arrangement of the gears within the casing;

Figure 12 is a detail view showing the construction of the main thrust bearing and the shroud 40 which extends within the blower casing into a position closely adjacent to the web of the combined blower and cutter wheel, as shown;

Figure 13 is a vertical section through the stalk feeding mechanism, illustrating the yielding yoke construction for yieldingly maintaining the feed member 15 against the stalks which are being fed along beneath it;

Figure 14 is a detail sectional view particularly showing the construction of the combined worm gear and spur gear 62—63 and its relationship to the cooperating parts of the transmission;

Figure 15 is a detail sectional view illustrating the arrangement of parts in the clutch shifting mechanism; and Figure 16 is a detail, vertical sectional view illustrating the apparatus for shifting the clutch to reverse the direction of operation of the stalk feeding mechanism.

In the illustrative machine there is provided a combined cutter and blower 10 having stalk cutting knives 11 and being mounted upon a horizontal driving shaft 12. The cutter cooperates with a stationary cutter bar 13 to form ensilage from stalks delivered past and over the cutter bar. Stalks are thus delivered by stalk delivery mechanism including an endless conveyer 14, a compressing and forwarding feeder 15, an upper feed roller 16, and a lower feed roller 17. The relative arrangements of these parts is clearly shown in Figure 6 of the drawings.

Figure 4 shows a unitary casting 18 which forms a support for the blower and cutter, the transmission casing, and the stalk delivery mechanism. In Figure 4, the cutter and blower shaft 12 is shown extending transversely of the support 18. This shaft is mounted in anti-friction bearings 19, 20 and 21, the intermediate one of which, in this instance, takes the end thrust exerted upon the shaft 12 by the inherent action of the gearing within the transmission and by the stalk cutting action, which tends to cause the blades 11 to separate from the stationary cutter 13.

By reference to Figure 5 of the drawings, it will be seen that the stationary cutter 13 is fixed upon the casting 18 adjacent a part of the casting which forms the transmission casing 23. The wall portion 24 is substantially the only separation between the stationary cutter 13 and the anti-friction bearing 20 for the shaft 12. It will also be noted that the wall portion 25 separating the cutter and the bearing 20 is thin, so as to enable the bearing to be mounted as near as possible to the center of the resistances set up during the operation of the machine. Furthermore, the proximity of the bearing 20 to the stationary cutter 13 advantageously counteracts any separating tendencies resulting from the shearing action of the cutter upon stalks as the cutter passes the stationary cutter. It will be appreciated that any separation of the blades of the cutter 10 and the stationary cutter bar 13 will greatly impair the operation of the machine by failure to cut the stalks, if not by breakage of the machine parts. The knives 11 of the cutter 10 must continue to move in such positions that they almost contact with the cutter bar 13 in order to insure the continued efficiency of the machine. It will also be appreciated that, due to the proximity of the bearing 20 and the cutter bar 13, and due to the fact that they are both rigidly supported on the same member, the moving cutting elements will be held in their proper and effective cutting positions. If the axial thrusts in the shaft 12 were counteracted by a bearing located on the side of the cutter opposite the cutter bar 13, there must necessarily be some separation of the cutting elements because of the fact that the cutter is substantially bridged by its supports. In other words, the uni-linear part of the casting 18 extending across that face of the cutter opposite the stationary cutter bar 13 is a member supported at its ends. If, then, the tendency of the members 13 and 11 to separate is of sufficient force, it will cause some lateral displacement of the mid-portion of that part of the casting just referred to. This displacement would allow the separation of the members 13 and 11 and thus permit impairment in the operation of the machine. This disadvantage is overcome by the construction described herein.

The cutter and blower 10 has blower blades 27 secured to a circular steel plate 28. This plate is fixed upon the shaft 12. The knives 11 for the blower and cutter are preferably supported at one side of the blades 27 by means of posts 29 fixed to the member 28.

The shaft 12, upon which the blower is fixed, is driven by a pulley 30 illustrated as mounted upon the shaft outside of the support 18. Excessive vibrations and destructive strains upon the machine are substantially eliminated by mounting the pulley end of the shaft 12 in an anti-friction bearing 19 which is located substantially within the vertical confines of the pulley. To support this bearing in this position, the member 18 is provided with an extension 32 which projects within the pulley, as indicated in the drawings.

On that side of the blower opposite the pulley 30 the shaft 12 extends through the gear casing 23, as particularly illustrated in Figure 11 of the drawings. An anti-friction bearing generally indicated at 20 is located within a pocket extension 33 of the gear casing. This extension provides a lubricant tight casing for the bearing and enables the bearing to be placed as closely as possible to the corner formed by the wall 34 of the stalk feeding mechanism and the portion of the support 18 extending at right angles thereto. To enable the bearing 20 to absorb end thrusts of the shaft 12, the inner ball bearing race 35 is fixed upon the shaft. To this end the part 35 is pressed onto the shaft. The shaft is formed with a shoulder 36 which serves to properly position the ball bearing lengthwise of the shaft. The outer race 37 of the ball bearing fits tightly between the posts 38 and 39, and abuts against a shroud 40 which serves to prevent the escape of lubricant into the blower part of the machine and to prevent the accumulation of material around the shaft. This shroud preferably extends through an opening in the gear casing, as indicated in Figure 11. An external groove 41 in the shroud receives the wall 25 of the gear casing and is preferably made wide enough to provide for the insertion of a felt washer or other suitable lubricant shielding means. Within the blower casing the shroud 40 is flared outwardly for the purpose of controlling the action of cut fodder within the casing and preventing its accumulation at positions where it will be detrimental to the operation of the machine. The shroud 40 is fixed to the support 18 and the posts 38 and 39 by means of bolts 43. On the sides of the posts opposite the shroud a lubricant shield 44 is fixed. The bearing 37 adjacent this shroud is held in position by a nut 45 screw threaded upon the shaft 12 for the purpose of properly locating the bearing in its position relative to the length of the shaft. The shaft portion 46 is somewhat reduced in diameter as compared with the remainder of the shaft for the purpose of facilitating the position of the nut 45.

Referring to Figure 11, a thrust relief spring 47 is shown abutting against a thrust washer 47' which is in contact with the nut 45. At the other end of this spring, a worm or worm gear 48 is rotatively mounted upon the shaft portion 46. Between the spring and the worm, a thrust washer 47'' is placed. The end of the worm 48 opposite the thrust relief spring 47 is formed with clutch teeth 49 cooperating with teeth 50 upon a clutch member 51 keyed to the shaft 12, as indicated at 52. A coil spring 53 contacting at one end against a fixed abutment 54 tends to press the clutch member 51 along the shaft 12 so as to maintain the worm 48 clutched to the shaft 12. However, if there should be an overload upon the machine, as when stalks are fed to the machine too rapidly, the excessive strain imposed will cause the clutch member 51 to move out of operative engagement with the worm 48 so as to prevent the breakage of parts. The end of the shaft 12 beyond the abutment 54 is preferably mounted in an anti-friction bearing supported by the gear casing extension 55, or by a grinding wheel housing, such as that shown at 56 in Figure 8 of the drawings.

The transmission is provided with selectively controlled power transmitting elements so that the parts illustrated in Figure 6 of the drawings may be driven by power derived from the shaft 12 in either of two directions, or in one direction at any one of three speeds. This transmission must take care of a quick reversal of the direction of movement of the conveyer 14 whenever the operator comes into contact with the bail 57. It must also provide for the driving of the feeder 15 and the upper and lower feed rollers 16 and 17 at different speeds.

The illustrative transmission includes a shaft 58, a second shaft or sleeve 59, a primary driven shaft 60, and a secondary driven shaft 61.

Meshing with the worm 48 is a worm gear 62 herein illustrated as loosely mounted upon the intermediate shaft 58. Rigid with the worm gear 62 the spur gear 63 is shown. This combined worm gear and spur gear forms a driving member loosely mounted upon the shaft 58 and abutting against a shoulder 64 above that shaft. The spur gear 63 is shown as formed with a clutch face including the pockets or indentations 65. The clutch face on the gear 63 permits the clutching and unclutching of the second shaft or sleeve 59, by means of a clutch member 66 non-rotatably mounted on the member 59. The clutch member 66 is formed with a fork receiving groove 67 in which a shifter fork 68 is received. This shifter fork is part of a structure operated by the bail 57 and referred to below.

On the end of the intermediate shaft 58 opposite the combined worm and spur gears 62 and 63, a combined spur gear and clutch 69 and 70 is located. This member is rotatively mounted upon the shaft 58, and serves, through the interposition of a thrust collar 71, to maintain the sleeve or second shaft 59 in place upon the intermediate shaft 58. The surface of the members 69 and 70 opposite the collar 71 abuts against a thrust collar 72. Non-rotatively mounted upon the sleeve or second shaft 59 and located between the clutch member 66 and the spur gear 69 is a dual, slidable gear member 73 upon which is formed spur gears 74 and 75. Within the teeth of the spur gear 75 clutch teeth 76 are formed. These clutch teeth are adapted to interlock with the teeth of the clutch 70 when the member 73 is shifted to the left hand limit of its path of movement, as illustrated in Figure 11. The sleeve 59 is preferably splined, as illustrated at 77 in Figure 4 of the drawings, and the member 73 is provided with a groove 78 to receive the shifting member 79. This shifting member is carried by a shift rod 80 slidable within a bearing 81 in the end of the gear casing. The shift rod is provided with a plurality of holes 82 for the reception of a pin 83 passing through opposite perforations in the bearing 81. These devices operate to hold the member 73 in any one of its three positions of adjustment.

The primary driven shaft 60 carries three spur gears 84, 85 and 86. These gears are keyed upon the shaft, the first two being adapted to mesh with the spur gears 74 and 75, respectively, and the gear 86 being in constant mesh with the spur pinion 69. The shaft 60 is rotatably supported by bearings 87 and 88. This shaft extends outwardly of the gear casing, as clearly indicated in Figure 11, extending across and underneath the stalk feeding mechanism so as to be positioned to drive the member 15 by suitable transmission mechanism located within the shield 89.

The secondary driven shaft 61 is directly connected to the sprocket 90 around which the conveyer 14 is trained. This shaft rotatively carries a spur gear 91 adapted to be clutched to the shaft by means of a slidable clutch member 92. This clutch member is formed with the usual groove 93 for the reception of the shifter fork 94 which moves in unison with the shifter fork 68, but in opposite directions. That is, when the shifter fork 94 is moved to clutch the gear 91 to the shaft 61, the shifter fork 68 is moved in an opposite direction to unclutch the spur gear 73 from the sleeve or second shaft 59. The gear 91 is constantly in mesh with a reverse idler gear 95 mounted upon a trunnion or stub shaft 96. This idler is constantly in mesh with the spur gear 63. At the end of the transmission opposite the gear 91 the shaft 61 carries a spur gear 97 fixed thereon. This spur gear is constantly in mesh with the spur pinion 69 rotatively mounted upon the intermediate shaft 58.

Taking the shaft 12, or its reduced portion 46, as the driving shaft of the transmission, the arrangements by which different speeds are transmitted to the stalk feeding mechanism will now be traced. For intermediate speed, the drive is from the worm 48 through worm gear 62, clutch members 65 and 66, sleeve or second shaft 59, spur gear 75, and gear 85 to the shaft 60 which operates the lower feed roller 17. The upper feed roller is driven from the gear 97 by means of intermeshing spur gears 98 and 99 shown in Figure 2 of the drawings. The stub shaft 100 fixed to the gear 99 is connected to the shaft of the upper feed roller 16 by means of the universal joints 101 and 102 and the telescoping shaft construction 103. The high speed to the stalk feeding mechanism is from the worm 48, through the worm gear 62, the clutch members 65 and 66, sleeve or second shaft 59, spur gear 74, gear 84 fixed on the shaft 60.

The low speed drive to the stalk feeding mechanism takes place when the dual gear member 73 is at its extreme left hand position, as illustrated in Figure 11 of the drawings. In this position the internal gear teeth or clutch teeth 76 engage with the clutch teeth 70 formed upon the spur pinion 69. The drive for this low speed is, therefore, from the worm 48, through worm gear 62, clutch members 65 and 66, the sleeve or second shaft 59, the clutch members 70 and 76, spur gear 69, and spur gears 86 and 97 to the shafts 60 and 61, respectively. In any one of the above mentioned arrangements of gears, the drive to the shaft 61 is from the spur pinion 69 to the gear 97, the latter being fixed upon the shaft 61.

It will be noted that in all of the above described arrangements of gearing for the three different speeds, the sleeve or second shaft 59 is employed in its condition in which it rotates with the worm gear 62 and the spur gear 63. When the operator desires to reverse the movement of the parts of the stalk feeding mechanism, or when the operator accidentally comes into contact with the bail 57, the shifter forks 68 and 94 are moved in opposite directions by the turning of the upright shaft 104 through the crank arm 105 and the link 106 connected to the bail 57. When the shaft 104 is turned, it moves a notched segment 104' having three notches corresponding to the forward, neutral and reverse positions of the gearing. The side walls of these notches cooperate with a spring pressed cam detent 105' located within a housing 106' shown as forming an integral part of the cover for the transmission casing. When such movement takes place, the clutch member 66 is moved to the left so as to disconnect the sleeve 59 from the combined worm and spur gear 62—63, and the clutch member 92 is moved toward the right to fix the gear 91 to the shaft 61. When this action takes place, the drive is through worm 48, worm gear 62, reverse idler 95, spur gear 91, shaft 61, gear 97, spur pinion 69, spur gear 86, and shafts 70 and 100.

For convenience in sharpening the cutting knives of the ensilage cutter, a grinding wheel 107 may be provided, as illustrated in Figure 8 of the drawings. This grinding wheel is carried by the casing 56 which houses spur gears 108 and 109, the latter being fixed to the shaft portion 46, and the former being fixed to a stub shaft 110. A work rest 111 is provided for facilitating the grinding operation.

The cover for the gear casing is illustrated at 112 in Figure 10 of the drawings, this cover being shown as carrying the gear shifting parts 68, 104 and 105. This cover also carries the spur gears 98 and 99 which drive the upper feed roller 16.

For enabling the stalk feeding mechanism to respond properly to variations in the supply of stalks fed to the machine, the feed member 15 is mounted so that it can move up and down according as the supply of stalks is great or small. To permit such movement, the wall 34 of the stalk feeding mechanism is formed with an opening 113, as shown in Figure 8 of the drawings. Another opening is provided in the opposite wall 114. Figure 8 also illustrates the manner in which the shaft for the member 15 is mounted. This shaft is carried by a radius rod 115 pivoted at one end about an axis coincident with the axis of the upper feed roller 16.

The upper feed roller 16 is mounted so that it may yield upwardly in response to variations in the amount of stalks passing between it and the lower feed roller 17. The mechanism by which this is accomplished includes a yoke 116 capable of sliding movement in upright guideways 117 fixed to the walls 34 and 114 of the stalk feeding mechanism. The legs of the yoke have holes at their lower ends for receiving the shaft 118 carrying the uper feed roller. The yoke 116 is pressed downwardly by a spring 119 fixed at its lower end to a cover 120 secured to the walls of the stalk feeding mechanism. The upper end of the spring 119 is preferably adjustably secured to the yoke 116 by means of a screw threaded eye bolt 121.

The stalk feeding mechanism walls 34 and 114 are prevented from separating by means of uprights 122 and 123 which are prevented at their upper ends from diverging movements by a tension rod 124.

The housing for the combined blower and feeder is completed by a lower, substantially semi-circular part 125 secured to the support 18. Above the support 18 is secured a stack 126 which acts in conjunction with a segmental housing 127 to complete the upper part of the enclosure for the combined blower and cutter. The part 127 is readily attachable and detachable with respect to the part 126 by manually operable means including the anchor 128 and the lever 129.

The illustrative machine is supported by an A-frame 130, the sides of which converge forwardly to upwardly diverging supports 131 secured to the conveyor mounting or feed table 132. At the forward end of the A-frame and near the point of securement of the member 131 to the A-frame a front transport truck indicated generally by the numeral 133 is provided. At the rear end of the machine the parts of the A-frame are rigidly secured to the support 18 by means of uprights 134, 135 and 136.

Although the invention has been illustrated by reference to a particular machine, it is to be appreciated that it is not necessarily limited to the precise structure shown and described, but that it is of a scope commensurate with the subject-matter set forth in the subjoined claims.

What is claimed as new is:

1. An ensilage cutter comprising, in combination, a rotatable cutter, feeding mechanism for presenting stalks to the cutter, speed transmission gearing operatively interposed between the cutter and the feeding mechanism for driving the latter, a unitary casting encompassing and supporting the cutter, a housing for the feeding mechanism extending at right angles to the casting, a lubricant tight casing for the transmission gearing rigid with the casting, means for rigidly securing the housing to the casing and to the casting, a stationary cutter knife against which the cutter moves, means for rigidly securing said knife to the casting, a shaft for supporting and driving the cutter, a bearing for said shaft within the casing and positioned adjacent a wall of the housing and in a wall of the casting, and a bearing support rigid with the casting for causing the bearing to take the end thrust of the shaft.

2. An ensilage cutter comprising, in combination, a unitary casting forming a cutter and blower support, a gear casing rigidly attached to the casing, a stalk cutter and blower rotatively supported by said casting and rotating through an opening in the casting, a drive shaft extending transversely of the opening and transversely through the gear casing, said casting forming a wall between the gear casing and the cutter opening, bearing means located upon the gear casing side of said wall for taking radial and end thrusts of said shaft, variable speed transmission mechanism in said casing, a driven shaft extending through said casing and substantially beyond one end thereof at right angles to the driving shaft, said variable speed transmission transmitting selectively any one of said speeds to said driven shaft, and stalk feeding mechanism operated by said driven shaft and feeding stalks over a stationary cutter bar resting upon said casting.

3. An ensilage cutter comprising, in combination, a rotatable cutter, feeding mechanism for presenting stalks to the cutter, variable speed transmission gearing operatively interposed between the cutter and the feeding mechanism for driving the latter at various speeds for any single speed of the cutter, a unitary casting supporting the cutter, a housing for the feeding mechanism extending at right angles to the casting, a lubricant tight casing for the transmission gearing rigid with the casting, means for rigidly securing the housing to the casing and to the casting, a stationary cutter knife against which the cutter moves, means for rigidly securing said knife to the casting, a shaft for supporting and driving the cutter, a bearing for said shaft within the casing and positioned in the corner formed by a wall of the housing and a wall of the casting, and a bearing support rigid with the casting for causing the bearing to take the end thrust of the shaft.

4. An ensilage cutter comprising, in combination, a rotatable cutter, feeding mechanism for presenting stalks to the cutter, variable speed transmission gearing operatively interposed between the cutter and the feeding mechanism for driving the latter at various speeds for any single speed of the cutter, a unitary casting supporting the cutter, a housing for the feeding mechanism extending at right angles to the casting, a lubricant tight casing for the transmission gearing rigid with the casting, means for rigidly securing the housing to the casing and to the casting, a stationary cutter knife against which the cutter moves, means for rigidly securing said knife to the casting, a shaft for supporting and driving the cutter, a bearing for said shaft within the casing and positioned in the corner formed by a wall of the housing and a wall of the casting, a bearing support rigid with the casting for causing the bearing to take the end thrust of the shaft, a worm fixed on said shaft within the casing for driving the transmission gearing, and a worm gear driven by said worm so as to cause said shaft to have end thrust toward the cutter, said bearing support having a shroud enclosing the bearing upon one side.

5. An ensilage cutter comprising, in combination, a rotating cutter, a support extending across the face of the cutter, a shaft for supporting and rotating the cutter, a stationary cutter rigidly secured to the support, stalk feeding mechanism for feeding stalks past and over the stationary cutter, transmission gearing interposed between said shaft and the stalk feeding mechanism for driving the latter, a casing for said gearing rigidly united to the support and having an extension pocket extending into the position in proximity to the intersection of the rotary cutter and the stalk feeding mechanism, and bearing means held in fixed position within said pocket and acting to absorb all of the axial thrust of the shaft due to the shearing action of the rotary cutter as it moves past the stationary cutter.

6. An ensilage cutter comprising, in combination, a rotating stalk cutter, a stalk feeding mechanism for feeding stalks to the cutter, interchangeably locked slidable gear transmission interposed between the cutter and the stalk feeding mechanism for operating the latter at various speeds relative to the speed of the cutter, a unitary frame supporting the stalk feeding mechanism and the cutter and forming a lubricant tight casing for the entire transmission, an end thrust bearing located in a part of that casing extending into the corner between the cutter and the stalk feeding mechanism, a support for the bearing, and a fixed shroud secured to the support and extending through the casing to a position in which it is closely adjacent to the cutter.

7. An ensilage cutter comprising, in combination, a rotating stalk cutter, stalk feeding mechanism for presenting stalks to the cutter, a variable speed interchangeably locked gear transmission interposed between the cutter and the stalk feeding mechanism for operating the latter at various speeds relative to the speed of the former, a rigid support for the stalk feeding mechanism and the cutter having a part forming a lubricant tight casing for the entire transmission, reversing gearing in the transmission, control mechanism for said reversing gearing governed from a position on the stalk feeding mechanism, and gear shifting mechanism included in said control mechanism and having a spring pressed cam lock for producing a quick movement of the shifter mechanism and for substantially locking the reverse gearing in place after the shifter mechanism has been moved.

In testimony whereof we affix our signatures.

CLEMMA R. RANEY.
GEORGE M. MERWIN.
HARRY A. WATCHEK.